US012057097B2

(12) United States Patent
Woelfl

(10) Patent No.: US 12,057,097 B2
(45) Date of Patent: Aug. 6, 2024

(54) EARPHONE SYSTEM AND METHOD FOR OPERATING AN EARPHONE SYSTEM

(71) Applicant: Harman Becker Automotive Systems GmbH, Karlsbad (DE)

(72) Inventor: Genaro Woelfl, Salching (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 107 days.

(21) Appl. No.: 17/774,927

(22) PCT Filed: Nov. 8, 2019

(86) PCT No.: PCT/EP2019/080743
§ 371 (c)(1),
(2) Date: May 6, 2022

(87) PCT Pub. No.: WO2021/089176
PCT Pub. Date: May 14, 2021

(65) Prior Publication Data
US 2022/0328029 A1 Oct. 13, 2022

(51) Int. Cl.
*G10K 11/178* (2006.01)
*G10K 11/175* (2006.01)
*H04R 1/10* (2006.01)

(52) U.S. Cl.
CPC .... *G10K 11/1752* (2020.05); *G10K 11/17855* (2018.01); *G10K 11/17881* (2018.01);
(Continued)

(58) Field of Classification Search
CPC .................. G10K 11/1752; G10K 2210/1081
See application file for complete search history.

(56) References Cited

U.S. PATENT DOCUMENTS

2005/0254665 A1* 11/2005 Vaudrey ........... G10K 11/17853 381/72
2011/0235813 A1* 9/2011 Gauger, Jr. ............. G10L 21/02 381/74

(Continued)

FOREIGN PATENT DOCUMENTS

WO 2015148658 A1 10/2015
WO 2018053114 A1 3/2018

OTHER PUBLICATIONS

International Search Report dated Jun. 23, 2020 for PCT Appn. No. PCT/EP2019/080743 filed Nov. 8, 2019, 12 pgs.

(Continued)

*Primary Examiner* — Ping Lee
(74) *Attorney, Agent, or Firm* — Brooks Kushman P.C.

(57) ABSTRACT

An earphone system comprises at least one earphone configured to be inserted in an ear of a user, wherein each of the at least one earphone comprises at least one sound reproduction unit, and a remote unit that is separate from each of the at least one earphone, wherein the remote unit comprises at least one microphone configured to capture ambient sound. The remote unit is configured to evaluate, analyze and/or process the ambient sound captured by the at least one microphone, to determine one or more of at least one ambient sound parameter, at least one control parameter, and at least one control command, based at least on the evaluation, analysis and/or processing of the ambient sound, and to send the at least one ambient sound parameter, the at least one control parameter and/or the at least one control command to the at least one earphone.

18 Claims, 2 Drawing Sheets

(52) U.S. Cl.
CPC ......... *H04R 1/1016* (2013.01); *H04R 1/1041* (2013.01); *H04R 1/1083* (2013.01); *G10K 2210/1081* (2013.01); *G10K 2210/3214* (2013.01); *H04R 2420/07* (2013.01); *H04R 2430/01* (2013.01); *H04R 2460/01* (2013.01)

(56) References Cited

U.S. PATENT DOCUMENTS

| | | | | |
|---|---|---|---|---|
| 2013/0244734 | A1* | 9/2013 | Latham ............... | H04M 1/0258<br>455/569.1 |
| 2015/0281829 | A1* | 10/2015 | Gauger, Jr. ............ | H04K 3/825<br>381/71.6 |
| 2016/0203700 | A1* | 7/2016 | Bruhn .................. | H04R 1/1041<br>340/506 |
| 2017/0352342 | A1 | 12/2017 | Lee | |
| 2020/0261687 | A1* | 8/2020 | Kremer .................. | H04R 1/406 |
| 2020/0265823 | A1* | 8/2020 | Kremer ................ | G10K 11/178 |

OTHER PUBLICATIONS

International Preliminary Report on Patentability dated May 19, 2022 for PCT Appn. No. PCT/EP2019/080743 filed Nov. 8, 2019, 7 pgs.

* cited by examiner

EARPHONE SYSTEM AND METHOD FOR OPERATING AN EARPHONE SYSTEM

CROSS-REFERENCE TO RELATED APPLICATION

This application is the U.S. national phase of PCT Application No. PCT/EP2019/08743 filed on Nov. 8, 2019 the disclosure of which is hereby incorporated in its entirety by reference herein.

TECHNICAL FIELD

The disclosure relates to earphone systems and methods for operating earphone systems, in particular to earphone systems providing a pleasant sleeping environment for a user.

BACKGROUND

Many different disturbing sounds and noises may prevent people from sleeping deeply through the whole night. Neighbors may cause unwanted noise, another person in the room may snore, or a street or a railway line close to the bedroom may cause continuous or recurring noise, just to name some examples. There is a need for an earphone system that provides a pleasant sleeping environment for a user, thereby improving the sleep of the user.

SUMMARY

An earphone system includes at least one earphone configured to be inserted in an ear of a user, wherein each of the at least one earphone includes at least one sound reproduction unit, and a remote unit that is separate from each of the at least one earphone, wherein the remote unit includes at least one microphone configured to capture ambient sound. The remote unit is configured to evaluate, analyze or process the ambient sound captured by the at least one microphone, to determine one or more of at least one ambient sound parameter, at least one control parameter, and at least one control command, based at least on the evaluation, analysis or processing of the ambient sound, and to send the at least one ambient sound parameter, the at least one control parameter or the at least one control command to at least one of the at least one earphone. The at least one earphone is configured to control sound that is reproduced by the respective sound reproduction unit, in response to the at least one ambient sound parameter, the at least one control parameter or the at least one control command received from the remote unit.

A method includes capturing ambient sound via a remote unit including at least one microphone, evaluating, analyzing or processing the ambient sound captured by the at least one microphone in the remote unit, determining one or more of at least one ambient sound parameter, at least one control parameter, and at least one control command based at least on the evaluation, analysis or processing of the ambient sound in the remote unit, and sending the at least one ambient sound parameter, the at least one control parameter, or the at least one control command to at least one of at least one earphone in order to control at least one function of the at least one earphone, wherein each of the at least one earphone is separate from the remote unit and is configured to be inserted in an ear of a user, and wherein each of the at least one earphone includes at least one sound reproduction unit. The method further includes controlling sound that is reproduced by the respective sound reproduction unit, in response to the at least one ambient sound parameter, the at least one control parameter or the at least one control command received from the remote unit.

Other systems, methods, features and advantages will be or will become apparent to one with skill in the art upon examination of the following detailed description and figures. It is intended that all such additional systems, methods, features and advantages be included within this description, be within the scope of the invention and be protected by the following claims.

BRIEF DESCRIPTION OF THE DRAWINGS

The method may be better understood with reference to the following description and drawings. The components in the figures are not necessarily to scale, emphasis instead being placed upon illustrating the principles of the invention. Moreover, in the figures, like referenced numerals designate corresponding parts throughout the different views.

DETAILED DESCRIPTION

Figure 1:
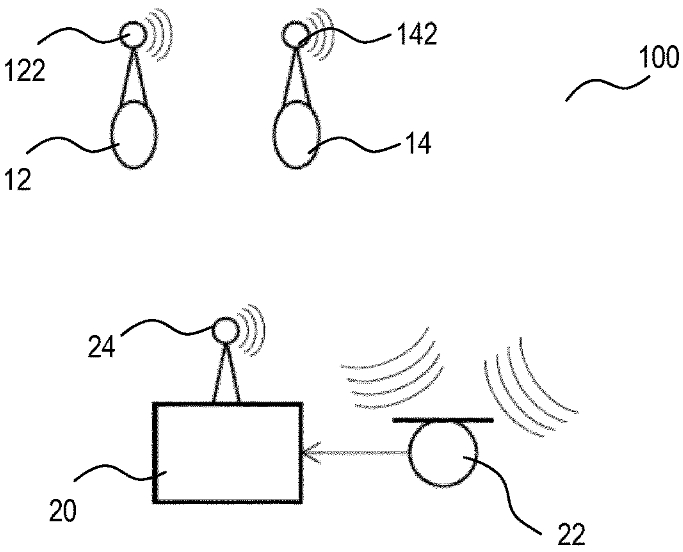
FIG. 1 schematically illustrates an exemplary earphone arrangement.

Tiny earphones may be worn by a user during sleep that play relaxing sounds throughout the night in order to mask ambient noise (ambient sound) occurring in the environment of a user. At other times, for example, before the user of the earphones desires to sleep, general audio content may be played over the earphones. The general audio content may be audio content such as, for example, music, an audio book, or a podcast. Such earphones generally need to be comparably small in order not to be unpleasant to wear for the user. However, an extreme miniaturization may have a limiting effect on the functions of such earphones. For example, earphones may only be able to play masking sounds stored locally inside the earphones for a maximum of, e.g., 12 hours. General audio content, for example, may be streamed wirelessly to the earphones for a limited time (e.g., for two hours), OT may be stored locally on the earphone. Battery size, for example, may be the limiting factor for playback time as batteries are large as compared to the size of the earphones. Therefore, a battery may require about 80% of the total volume of the earphones. Small batteries, however, may only be able to provide energy for a certain amount of time, for example, less than 8 hours of playback of locally stored audio files.

It is also possible that earphones provide active noise cancellation (ANC). That is, the ambient noise may be detected and evaluated and an acoustic signal may be output by the earphones which cancels out the ambient noise at least to a certain degree. ANC may be combined with playback of masking sound or general audio content. In order to provide ANC over prolonged periods of time (e.g., 12 hours or more), earphones are generally required to be much larger in size than earphones that only provide masking of the ambient sound. Reasons for this are additional power consumption of analog or digital circuitry utilized for the ANC signal processing as well as for one or more ANC microphones. These additional power requirements may result in an increase of the battery size. Therefore, earphones providing an ANC function throughout the entire night, for example, may be too large to be comfortable for a user to wear at night.

The earphone system that will be described in the following is configured to be worn by a user while and prior to sleeping and to playback masking sounds and, optionally, general audio content and, additionally or optionally, provide active noise cancellation. Not all users like noise masking and prefer ANC instead, or vice versa. Further, noise masking may not work well in certain cases, for example, with regard to typical bedroom noises (e.g., snoring noise. That is, in some cases the soothing sounds for masking may not be able to fully mask the noise and at least a certain amount of the noise may still be perceptible by the user. In such cases, a combination of ANC and noise masking or ANC alone may be most beneficial. For playback of general audio content, for example, before the user wants to sleep, it may be desirable to keep audio volumes low while the user is preparing to sleep. At the same time, a user may want to listen to audio content without disturbance from ambient sound. Therefore, even general audio content may be adapted, similarly, to masking sound, regarding frequency spectrum and loudness level in order to avoid a disturbance of the listening experience.

Typically, bedroom noises are not present throughout the whole night. For example, snoring may occur sporadically, a neighbor's party may end, or traffic noise levels may vary over time. Hence, noise masking and active noise cancellation (ANC) will usually not be required throughout the whole night and may be switched off at least for certain periods of time throughout the night.

For noise masking to be most effective, one or more parameters of a masking sound may be adapted to the respective parameters of the noise, in order to output an acoustic signal which basically drowns out the noise. The acoustic signal, therefore, may be adapted in order to match one or more sound parameters (e.g., a spectral shape, a loudness measure, a band energy, or a band loudness) of the noise as close as possible. ANC may be adapted to cancel the present ambient noise as efficiently as possible. ANC systems are usually intended to reduce or even cancel a disturbing signal, such as noise, by providing at a listening site a noise reducing signal that ideally has the same amplitude over time but the opposite phase as compared to the noise signal. By superimposing the noise signal and the noise reducing signal, the resulting signal, also known as error signal, ideally tends toward zero. These adaptions of noise masking and noise cancellation require an analysis of the current ambient noise, which generally is an energy-consuming task. Therefore, in the earphone system described herein, ambient noise is analyzed in a remote device. Further, signal processing that is performed within the earphones is controlled remotely by the remote device. In this way, ANC and noise masking may only be applied whenever they are required (when noise occurs), and noise masking as well as ANC may be optimized based on state of the art algorithms running on the remote device. As certain functions are performed in the remote device instead of in the earphones, the power consumption of the earphones may be comparably low.

Noise masking and ANC may not be required when the user is sleeping, even if ambient noise is detected. Therefore, the earphone system, according to one example, may be configured to perform sleep supervision which controls the sound processing of the earphones. Such sleep supervision may be performed in the remote device, for example. Sleep supervision performed by the remote unit will be described in more detail further below.

Now referring to FIG. 1, an earphone system 100 according to one example is schematically illustrated. An earphone system 100 may include a remote unit 20 that is configured to perform ambient noise analysis and earphone control. The remote unit 20 may comprise at least one microphone or microphone array 22 configured to receive ambient noise. The acoustic noise signal received by the at least one microphone 22 may be evaluated, analyzed and/or processed in suitable ways to receive information about the ambient noise. The processing may be performed in a processing unit such as a microcontroller or a signal processor (not specifically illustrated in FIG. 1), for example, which may be configured to convert the acoustic noise signal received from the at least one microphone 22 into a digital signal (e.g. by an analog-digital-conversion ADC), apply band- or weighting filters, or evaluate the spectral content or spectral energy distribution (e.g. by Fast Fourier Transformation (FFT) or a filter bank).

The earphone system 100 further comprises as least one earphone 12, 14. When the earphone system 100 is in use, each of the at least one earphone 12, 14 may be wirelessly connected to the remote unit 20. That is, a permanent or intermittent wireless connection may be established between the remote unit 20 and the at least one earphone 12, 14 after activating the earphone system 100. Such a wireless connection may be, for example, a Bluetooth or Bluetooth Low Energy connection. Other wireless connections, however, are also possible. It is also possible that the remote unit 20 is connected to the at least one earphone 12, 14 via a WIFI connection or an amplitude (AM) or frequency (FM) modulated radio signal, for example. Generally, the at least one earphone 12, 14 may be known to the remote unit 20. A pairing process may be performed when the earphone system 100 is used for the first time. Afterwards, the earphones 12, 14 may automatically connect with the remote unit 20 when switching on the earphone system 100. In this way, the earphones 12, 14 of one system 100 may be controlled by the remote unit 20 of the same earphone system 100 but not by the remote unit 20 of another earphone system 100. In the example illustrated in FIG. 1, the earphone in system 100 comprises two earphones 12, 14. That is, one earphone 12, 14 for each ear of the user. However, some users may prefer to use only one earphone. That is, a user may only wear an earphone in his right ear, while he does not wear an earphone in his left ear, or vice versa. In such cases, only one earphone 12 or 14 may be wirelessly connected to the remote unit 20.

According to one example, the remote unit 20 may further comprise (e.g., store) information about the one or more earphones 12, 14 (such information will also be referred to as earphone information in the following) that are connected to the remote unit 20. Part of this earphone information may include information (e.g., spectral content, energy distribution, or playback level) about one or more masking signal(s) that the one or more earphones 12, 14 may playback for a user or that are stored in the one or more earphones 12, 14, for example, in a local memory (not specifically illustrated in FIG. 1). Another part of this earphone information may comprise one or more acoustic transfer function(s), for example, from an external position (position external to the at least one earphone 12, 14, the remote unit 20, and the user) to the ear canal of a user, dummy or test fixture (e.g., with or without ANC) with the one or more earphones 12, 14 arranged in the ears of the user, dummy or test fixture (passive or active transfer function) or of acoustic transducers comprised in the one or more earphones 12, 14.

Further, information about active noise insertion loss controlled by one or more ANC configuration(s) of the one or more earphones 12, 14 may be stored, for example, in the remote unit 20. The remote unit 20 may be configured to, based on the ambient noise signal received by the remote unit 20 and based on the information stored in the remote unit 20, determine control parameters or control commands that are subsequently transferred to at least one of the earphones 12, 14. Any signals or commands that are sent from the remote unit 20 to the at least one earphone 12, 14 may be transmitted, for example, over a radio connection or any other suitable wireless connection. These control parameters or control commands may be configured to control an operating mode or the signal processing within the at least one earphone 12, 14. For example, sound playback (sound generation) for noise masking or ANC of the at least one earphone 12, 14 may be turned on or off. A certain masking signal may be chosen from a set of masking signals stored in a local memory of the at least one earphone 12, 14. Signal processing within the at least one earphone 12, 14 that controls noise masking and/or ANC may be controlled either by control parameters (e.g. volume level, filter coefficients) or in control commands that control the operation of the at least one earphone 12, 14. Control commands may, for example, control which of multiple coefficient sets stored locally in the at least one earphone 12, 14 is applied in the at least one earphone 12, 14 to process sound for noise masking or noise cancellation.

Still referring to FIG. 1, the remote unit 20 may comprise a first communication unit 24 configured to transmit signals. Signals to be sent to the at least one earphone 12, 14 may be sent, for example, via the communication unit 24. Such signals may include the control parameters or control commands, for example, that are configured to control at least one function of the at least one earphone 12, 14. It is also possible that the communication unit 24 is further configured to receive signals from the at least one earphone 12, 14 or from any other external device. Each of the at least one earphone 12, 14 may also comprise an earphone communication unit 122, 142 that is configured to receive signals from the remote unit 20. In one example, the earphone communication units 122, 124 may further be configured to send signals to the remote unit 20.

Figure 2:
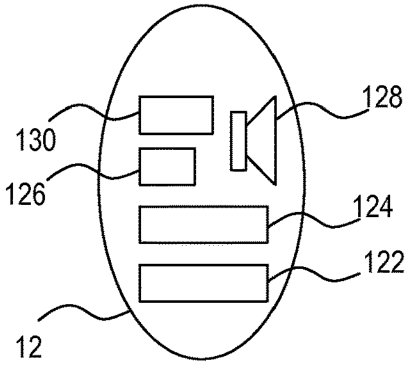
FIG. 2 schematically illustrates an exemplary earphone.

Now referring to FIG. 2, an earphone 12 according to another example is schematically illustrated. In the example illustrated in FIG. 2, the earphone 12 comprises a sound generation unit 128 (e.g., a loudspeaker). A masking sound and/or a noise reducing signal may be output by the sound generation unit 128. The earphone communication unit 122 has already been illustrated in FIG. 1. The earphone 12 may further comprise a control unit 124, a battery 126, and a memory unit 130). For example, the control unit 124 may be configured to process signals, control parameters and control commands received from the remote unit 20, to activate or deactivate the functions of the earphone 12, and to control the sound generation unit 428. The battery 126 may be configured to provide power to the different components of the earphone 12. The memory unit 130 may be configured to store one or more masking sounds that may be output via the sound generation unit 128. The control unit 124 may be configured to access the memory unit 130 when a masking sound is to be played via the sound generation unit 128.

The control unit 124, however, may not be required to evaluate, analyze and process the ambient noise. As has been described above, ambient noise processing takes place in the remote unit 20 instead. The remote unit 20 may transmit the results of the ambient noise evaluation, analysis and/or processing to the control unit 124. The control unit 124 then merely has to control the sound generation unit 128 to output a masking sound or a noise cancelling signal depending on the sound analysis results (e.g., sound parameter, or sound parameters), control parameters or control commands received from the remote unit. The earphone communication unit 122 may comprise at least one antenna, for example (antenna not specifically illustrated in FIG. 2).

Figure 3:
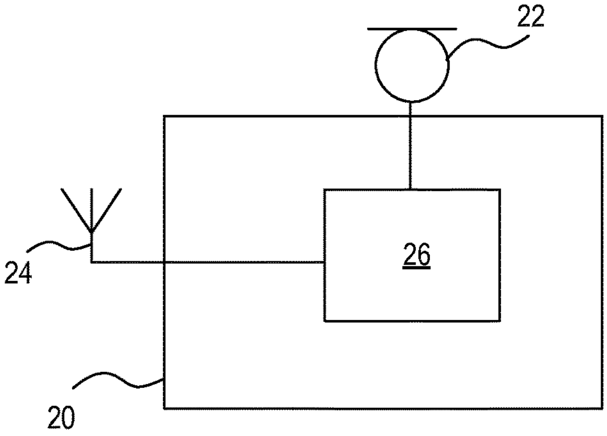
FIG. 3 schematically illustrates an exemplary remote unit.

Now referring to FIG. 3, an exemplary remote unit 20 is schematically illustrated. As has been described above, the remote unit 20 comprises at least one microphone 22 and a first communication unit 24. In one example, the first communication unit 24 may comprise at least one antenna. In one example, the remote unit 20 may further comprise a processing unit 26 such as a microcontroller or a signal processor. The processing unit 26 may be configured to evaluate, analyze and/or process the ambient noise detected by the at least one microphone 22.

The term "noise masking" as used herein refers to the superposition of a masking sound to unwanted noise in order to reduce the disturbance of a user due to the unwanted noise or to avoid perception of the noise as a separate signal, or even perception of the noise at all. Amongst other factors, the effectiveness of noise masking generally depends on the relative signal level and spectral content of the noise signal and the masking signal. For noise masking, a signal with known spectral content may be applied as a basic (unadapted) noise signal, for example, random noise (e.g., white, pink, or brown noise), or noise-like natural signals (wind, waves, fire etc.), or music (e.g., instrumental, chanting, etc.). The wider the frequency spectrum of the masking sound, the better the masking sound may be adapted to mask unwanted noise with arbitrary spectral content. Typically, satisfactory noise masking can be achieved if the masking sound and the unwanted noise exhibit a similar frequency spectrum. Therefore, the frequency spectrum of the masking sound may be adapted to the unwanted noise. Masking signals generally do not only mask signals at the same frequency but also, to a certain degree, below and above the frequency of the masking signal. The masking threshold of a masking signal, below which the masking signal masks other signals, varies over frequency. The masking threshold is at its highest level right at the frequency of the masking signal and gradually declines towards higher and lower frequencies. Due to the extended masking range of a given masking signal, especially towards higher frequencies, the frequency spectrum of in the masking signal may optionally comprise a narrower frequency range than the unwanted noise signal. The positions at which noise masking should preferably be effective when wearing earphones are the user's inner ear and ultimately the user's eardrums. Therefore, at least approximate information about unwanted sound and a masking signal at these positions may be required in order to optimize the noise masking.

Some of the ambient sound may leak into the inner ear even when an earphone 12, 14 is worn. Without any active measures, the transfer function of ambient sound from the outside to the inner ear is controlled by a passive insertion loss (PIL) of the earphones 12, 14. Hence, a typical PIL of at least one earphone 12, 14 may be utilized in order to determine an unwanted sound spectrum inside a user's ear. In addition, active noise cancellation may contribute an active insertion loss (AIL) to the total insertion loss (TIL). Therefore, TIL may have to be considered if ANC is applied. The remote unit 20 may be configured to apply transfer functions according to PIL or TIL to the ambient noise signal received by the at least one microphone 22 of the remote unit 20 in order to determine a noise signal that is representative of the noise signal in a user's ear. In one example, PIL or TIL transfer functions may have been determined previously by representative measurements. Such measurements, for example, may be carried out using suitable test fixtures that include artificial pinnae (e.g., headphone test fixtures or dummy heads) or using one or more human individuals as test persons. Information about PIL and/or TIL transfer functions may be stored in the remote unit 20, for example. Based on the representative noise signal it may, for example, be decided whether or not noise masking is required. In one example, noise masking may be de-activated or kept inactive if not required, or activated or kept active if required.

If noise masking is required, the frequency spectrum, loudness level and/or band energy or band loudness (energy loudness within at least one frequency band) of the masking sound may be adapted in accordance with the spectral content, loudness level and/or band energy or band loudness of the representative noise signal within at least one frequency range. Loudness within a frequency band may comprise an average sound pressure level over a certain period of time. Further, frequency weighting (e.g., A-weighting) and/or level-dependent signal compression may be applied for loudness evaluation. Weighting and/or compression may be based on human loudness perception curves (e.g., equal loudness curves). Information about the spectral content, signal level and/or band energy of the unadapted masking signal may be in available in the remote unit 20 or determined by the remote unit 20. Further, typical transfer function(s) of acoustic transducers or, in general, sound reproduction units 128 in the earphones 12, 14 may be known to the remote unit 20. This information may be combined, for example, in order to obtain at least one sound parameter of the masking sound, for example, a frequency spectrum, a loudness level or a set of band energy or band loudness levels. Such sound parameters, for example, may be available or determined for each masking sound of a set of masking sounds stored in the at least one earphone 12, 14. At least one parameter of the representative ambient sound signal and at least one sound parameter determined from an unadapted version of the masking signal played back in the at least one earphone 12, 14 may be compared to each other, and control parameter defining. e.g., a transfer function, gain factor or the like for masking signal adaption, may be determined by the remote unit 20, that adapts the frequency spectrum, loudness level or set of band energy or band loudness levels of the masking signal, e.g., in order to approximate the respective sound parameter of the representative ambient sound signal. The transfer function for the masking signal adaption may, for example, be represented by a set of filter coefficients, which the remote unit may send to the at least one earphone 12, 14. Such filter coefficients may describe or control the transfer function of at least one filter. The transfer function for masking signal adaption may also be represented by a set of one or more gain factors that control signal processing in the at least one earphone 12, 14. For example, a filter bank within the at least one earphone 12, 14 may comprise multiple band pass filters, peak filters, shelving filters, or the like. The gain in each filter may be controlled by the aforementioned gain factors in order to control masking signal loudness within respective frequency bands or ranges.

Methods for active noise cancellation in earphones generally include feed forward or feedback techniques. A feed forward system may comprise a microphone (not specifically illustrated in the Figures) that receives ambient sound and that is, for example, located below or within an external surface of an earphone. The microphone may adjoin ambient air when the earphone is arranged inside the ear of a user. The microphone receives ambient noise and the resulting microphone signal may subsequently be processed (e.g., filtered) and radiated (output) as cancellation sound towards the inner ear via a loudspeaker within the earphone. Processing may be performed such that within a cancellation frequency range the cancellation sound is essentially equal in level and inverse in phase as compared to in ambient sound leaked into the inner ear of a user wearing the earphone. The cancellation frequency range of feed forward noise cancellation systems in earphones depends on the passive acoustic transfer function of ambient noise from the outside to the inside of the user's inner ear. Further, the transfer function of the feed forward noise cancellation path, including at least the aforementioned microphone, signal processing and loudspeaker within the acoustic environment set by the earphones and a user's ear, influences the cancellation frequency range. Therefore, the cancellation frequency range may be adapted by adaption of a transfer function applied to the microphone signal via signal processing.

Feedback systems may comprise a microphone (not specifically illustrated in the Figures), for example, that is arranged inside a part of the earphone, and which adjoins the inner ear volume of a user of the earphone. The microphone receives the sound within the inner ear (e.g., the ear canal). The microphone signal may be processed and radiated towards the inner ear as cancellation sound via a loudspeaker within the earphone. Because the microphone also receives the signal radiated by the loudspeaker, a feedback loop comprising at least the microphone, signal processing and loudspeaker is constituted by the described arrangement. Mainly the open loop transfer function of the feedback loop controls the cancellation frequency range of a feedback noise cancellation system. The open loop transfer function may be adapted by adaption of a transfer function applied to the microphone signal via signal processing. Due to feedback system stability limitations, the maximum possible cancellation range is typically limited in terms of frequency and amplitude of the AIL. However, it is usually possible to choose between a wider frequency range with lower AIL and a smaller frequency range with higher AIL. Further, within stability limits, the frequency range with the highest AIL may be chosen.

The remote unit 20 may determine a noise signal that is representative of the noise signal in a user's ear. For this purpose, the remote unit 20 may apply a transfer function according to the typical PIL, of the earphones to the ambient noise signal received by the at least one microphone 22 in the remote unit 20. It may further analyze spectral energy distribution of the representative noise signal or a weighted and/or compressed or expanded representative ambient sound signal. Weighting may include application of a transfer function that is inverse to a typical equal level perception curve for humans (e.g., A-weighting). Weighting may optionally or additionally emphasize (boost) a lower frequency range, for which noise masking is less effective or more obtrusive than for a higher frequency range. Compression and/or expansion may be based on human equal loudness perception curves for various sound pressure levels. Because these curves are not parallel, especially at the lower frequency region, level- and frequency-dependent compression may be applied in order to determine loudness. For example, such compression and/or expansion, for example, may be applied with a low-shelve filter with variable filter parameters, which are controlled by the level of the signal that shall be processed dynamically (compressed or expanded). Level- and frequency-dependent processing may also be applied separately to various frequency bands, which, for example, may be provided by a filter bank or by fast Fourier transformation (FTT). Based on the spectral energy distribution of the representative noise signal or a weighted and/or dynamically processed representative ambient sound signal, it may be determined whether or not ANC is required. If ANC is not required, it may be deactivated or kept inactive.

If ANC is required, this function may be activated or kept active and/or an optimum cancellation range in terms of frequency and amplitude may be determined based on the spectral energy distribution of the representative noise signal or a weighted representative noise signal. Signal processing within at least one of a feed forward noise cancellation system and a feedback noise cancellation system within at least one earphone may be adapted accordingly. For example, a set of filter coefficients that determines the signal processing within a noise cancellation path may be chosen out of multiple coefficient sets stored either in the remote unit or the earphone. The set of filters may be chosen such that the resulting cancellation range in terms of frequency and amplitude provides most effective cancellation in a frequency range where the spectral energy distribution of the representative noise signal or a weighted and/or compressed or expanded representative noise signal is relatively high.

The sleep monitoring for controlling ANC and noise masking will be described in more detail in the following. In phases where the user of a noise masking and/or noise attenuating earphone system is asleep, noise masking and/or ANC may not be required. This may be the case irrespective of whether the volume level of the detected ambient noise/ambient sound is above a certain threshold level or not. Alternatively, threshold levels may be adapted to reflect reduced noise sensitivity. This is because the user may not be disturbed by the noise once asleep. Noises may primarily be disturbing when the user is trying to get to sleep. Once the user is asleep, the respective function of the earphones may be deactivated in order to save battery power. According to one example, the function(s) may be deactivated once the user is asleep irrespective of the volume of the ambient noise/ambient sound. According to another example, one or both functions may also be deactivated depending on the ambient noise/ambient sound volume levels. Ambient sound levels that are likely to wake the user up may still require masking and/or cancellation. That is, noise masking or ANC may only be applied if the volume level of the ambient noise exceeds a certain predefined threshold. According to one example, the user may adapt this threshold to his personal preferences. According to another example, this may be a preset threshold. Thresholds may be single values or multiple values (e.g., a different value for each frequency or frequency band of a plurality of frequencies or frequency bands) Ambient noise/ambient sound may be analyzed in the remote unit 20 as has been previously described. An ambient sound signal that is representative of the ambient sound signal in a user's ear may additionally be compared to certain threshold ranges for absolute sound level. If the volume of the detected ambient sound is above a certain threshold level, the function(s) may remain active. If the volume of the detected ambient sound is equal to or below the threshold level, the function(s) may be deactivated.

The remote unit 20 may comprise sensors suitable to monitor parameters that indicate whether or not a person is asleep (such parameters will also be referred to as user parameters in the following). Such user parameters may, for example, include movements of the user, body temperature, breathing rate, or breathing rhythm. For example, during deep sleep phases, the user may not move at all. The body temperature may be lower during sleep than during wake phases. The breathing rhythm may change if a person is asleep as compared to waking phases. In one example, for movement sensing, one or more radar sensors (electromagnetic wave based) ultra sound sensors or infrared radiation sensors may be utilized as known from motion detectors. Body temperature may, for example, be monitored by sensors that measure infrared radiation as known from thermal imaging. Breathing may be recorded by the at least one microphone or microphone array 22 of the remote unit 20 and analyzed by signal processing methods for breathing rates.

According to another example, the user may wear a smart watch, tracking wristband, or any other suitable device worn on the body that is able to detect user parameters such as heart rate, body temperature, movements, or any other parameters that may be an indication of whether or not the user is asleep. According to an even further example, user parameters may be determined via sensing devices that support the evaluation of one or more of the aforementioned user parameters such as, for example, movement sensing mattresses, electronic devices (smart phones or anything similar) comprising g-sensors (acceleration sensors), etc. Many people today use such devices for sleep monitoring. Such an external device may be wirelessly connected to the remote unit 20 and transmit any detected user parameters to the remote unit 20 for further evaluation and processing.

Figure 4:
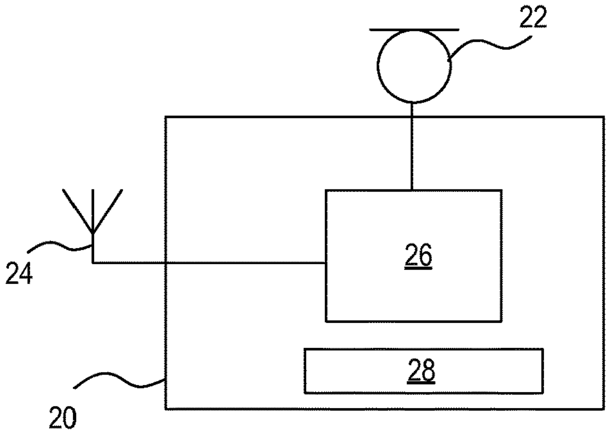
FIG. 4 schematically illustrates another exemplary remote unit.

Now referring to FIG. 4, the remote unit 20 may further comprise a user interface 28 that allows control of certain functions of the at least one earphone 12, 14 by the user. The user interface 28 may, for example, comprise a display for user interaction, buttons and/or at least one loudspeaker (not specifically illustrated in FIG. 4). The remote unit 20 may also comprise a docking system for storage and a battery for charging of the earphones 12, 14. The remote unit 20 may optionally be a charging case or base station for the at least one earphone, a smartphone, tablet computer, laptop, or any other suitable portable electronic device.

Figure 5:
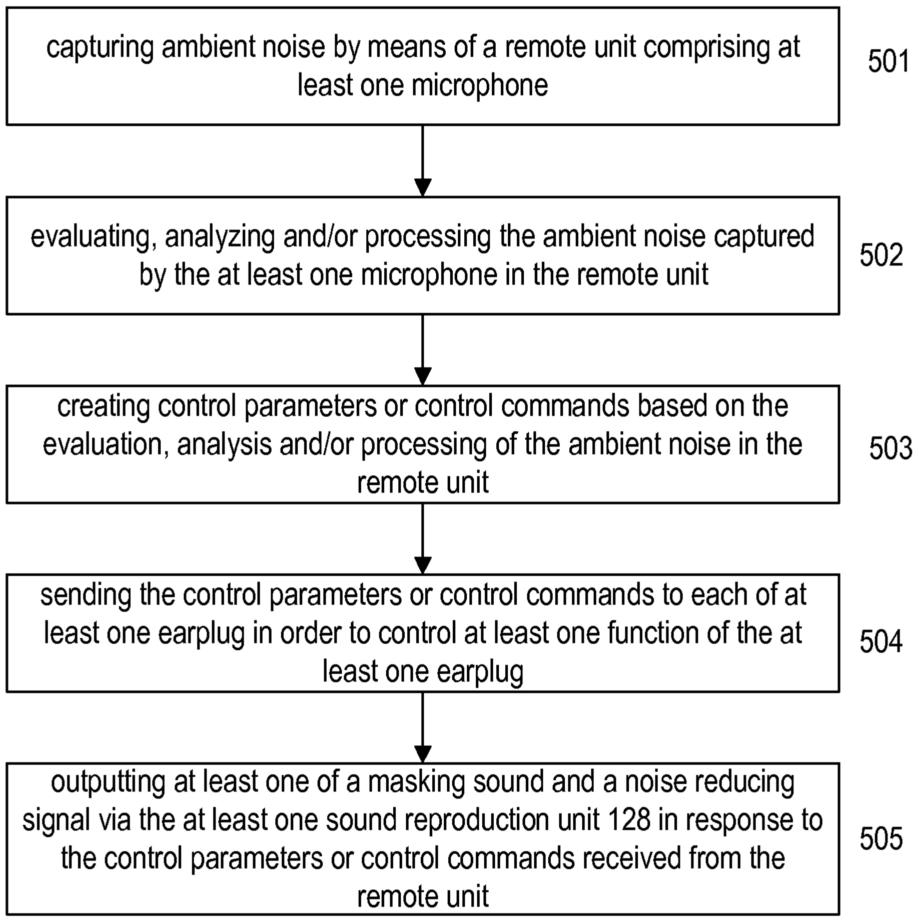
FIG. 5 schematically illustrates an exemplary method.

Now referring to FIG. 5, an exemplary method for operating an earphone system is illustrated. The method comprises capturing ambient noise via a remote unit 20 comprising at least one microphone 22 (step 501), evaluating, analyzing and/or processing the ambient noise captured by the at least one microphone 22 in the remote unit 20 (step 502), creating control parameters or control commands based on the evaluation, analysis and/or processing of the ambient noise in the remote unit 20 (step 503), sending the control parameters or control commands to each of at least one earphone 12, 14 in order to control at least one function of the at least one earphone 12, 14, wherein each of the at least one earphone 12, 14 is separate from the remote unit 20 and is configured to be inserted in an ear of a user, and wherein each of the at least one earphone 12, 14 comprises at least one sound reproduction unit 128 (step 504), and outputting at least one of a masking sound and a noise reducing signal via the at least one sound reproduction unit 128 in response to or controlled by the control parameters or control commands received from the remote unit 20 (step 505).

It may be understood, that the illustrated earphone systems are merely examples. While various embodiments of the invention have been described, it will be apparent to those in of ordinary skill in the art that many more embodiments and implementations are possible within the scope of the invention. In particular, the skilled person will recognize the interchangeability of various features from different embodiments. Although these techniques and systems have been disclosed in the context of certain embodiments and examples, it will be understood that these techniques and systems may be extended beyond the specifically disclosed embodiments to other embodiments and/or uses and obvious modifications thereof. Accordingly, the invention is not to be restricted except in light of the attached claims and their equivalents.

The description of embodiments has been presented for purposes of illustration and description. Suitable modifications and variations to the embodiments may be performed in light of the above description or may be acquired from practicing the methods. The described arrangements are exemplary in nature, and may include additional elements and/or omit elements. As used in this application, an element recited in the singular and proceeded with the word “a” or “an” should be understood as not excluding plural of said elements, unless such exclusion is stated. Further, references to “one embodiment” or “one example” of the present disclosure are not intended to be interpreted as excluding the existence of additional embodiments that also incorporate the recited features. The terms “first,” “second,” and “third,” etc. are used merely as labels, and are not intended to impose numerical requirements or a particular positional order on their objects. The described systems are exemplary in nature, and may include additional elements and/or omit elements. The subject matter of the present disclosure includes all novel and non-obvious combinations and sub-combinations of the various systems and configurations, and other features, functions, and/or properties disclosed. The following claims particularly point out subject matter from the above disclosure that is regarded as novel and non-obvious.

The invention claimed is:

1. An earphone system comprising:

at least one earphone configured to be inserted in an ear of a user, wherein each of the at least one earphone comprises at least one sound reproduction unit; and a remote unit that is separate from each of the at least one earphone, wherein the remote unit comprises at least one microphone configured to capture ambient sound, wherein the remote unit is configured to at least one of evaluate, analyze or process the ambient sound captured by the at least one microphone, to determine one or more of at least one ambient sound parameter, at least one control parameter, and at least one control command, based on the ambient sound, and to send at least one of the at least one ambient sound parameter, the at least one control parameter or the at least one control command to the at least one earphone, and wherein the at least one earphone is configured to control sound that is reproduced by the respective sound reproduction unit, in response to at least one of the at least one ambient sound parameter, the at least one control parameter or the at least one control command received from the remote unit, wherein the remote unit is configured to apply at least one representation of a passive insertion loss (PIL), an active insertion loss (AIL), or a total insertion loss (TIL) of the at least one earphone to a representation of an ambient sound signal captured by the at least one microphone, in order to determine an ambient sound signal representative for ambient sound entering the user’s ear, wherein the remote unit determines at least one of the at least one ambient sound parameter, the control parameter, and the control command at least based on the ambient sound signal representative for ambient sound entering the user’s ear, wherein the at least one earphone is configured to apply active noise cancellation, wherein the active noise cancellation as applied by the at least one earphone contributes to the AIL, and wherein the TIL is at least based on the AIL.

2. The earphone system of claim 1, wherein the sound controlled by the at least one earphone comprises at least one of a general sound, a masking sound, and a noise reducing sound; and controlling the sound that is reproduced by the at least one sound reproduction unit comprises at least controlling an output of the sound or controlling the adaptation of at least one sound parameter of the sound.

3. The earphone system of claim 1, wherein the at least one earphone is configured to adapt at least one sound parameter of the sound that is reproduced by the respective sound reproduction unit depending on at least one corresponding sound parameter of the ambient sound; and the at least one sound parameter represents at least one coefficient of at least one of a spectral shape, a frequency spectrum, a magnitude spectrum, a spectral content, and a loudness measure of at least one frequency range of the respective sound.

4. The earphone system of claim 1, wherein the remote unit is configured to determine the at least one control parameter or the control command at least based on at least one sound parameter of either one of a general sound and a noise masking sound, wherein the at least one sound parameter of the general sound or the noise masking sound is determined from an audio signal that is stored locally in the at least one earphone or that is transmitted wirelessly to the at least one earphone by the remote unit, and the at least one sound parameter of the general sound or of the noise masking sound is determined from the audio signal by applying of at least one transfer function of the at least one sound reproduction unit of the at least one earphone.

5. The earphone system of claim 1, wherein the remote unit is configured to determine the at least one control parameter or the control command at least based on a comparison of at least one sound parameter of either one of a general sound or a noise masking sound with at least one sound parameter of the ambient sound captured by the at least one microphone.

6. The earphone system of claim 1, wherein the remote unit is further configured to evaluate a sleep state of the user, wherein the sleep state indicates whether or not the user wearing the at least one earphone is asleep, or to receive information about the sleep state of the user from at least one external device, and control sound that is output via the at least one sound reproduction unit at least based on the sleep state of the user.

7. The earphone system of claim 6, wherein the remote unit is configured to evaluate the sleep state of the user, based on information about at least one of a heart rate, a body temperature, a breathing rate, a breathing rhythm, and movements of the user.

8. The earphone system of claim 7, wherein at least one of the remote unit and the at least one earphone further comprises at least one of a motion sensor, and a temperature sensor.

9. The earphone system of claim 8, wherein at least one of the motion sensor comprises a radar sensor, an ultra sound sensor or an infrared radiation sensor; and the temperature sensor comprises a sensor configured to measure infrared radiation.

10. The earphone system of claim 7, wherein the remote unit is configured to determine a breathing rate and a breathing rhythm of the user based on breathing noises captured by the at least one microphone.

11. The earphone system of claim 1, wherein the remote unit further comprises a user interface.

12. The earphone system of claim 1, wherein each of the at least one earphones receives signals, the signals comprising results of the at least one of evaluation, analysis or processing of an ambient noise.

13. The earphone system of claim 1, wherein the remote unit is a charging case or base station for the at least one earphone, a smartphone, a tablet computer, or a laptop.

14. A method comprising:

capturing ambient sound via a remote unit comprising at least one microphone;

evaluating, analyzing or processing the ambient sound captured by the at least one microphone in the remote unit;

determining one or more of at least one ambient sound parameter, at least one control parameter, and at least one control command based at least on the evaluation, analysis or processing of the ambient sound in the remote unit;

sending the at least one ambient sound parameter, the at least one control parameter, or the at least one control command to at least one earphone in order to control at least one function of the at least one earphone, wherein each of the at least one earphone is separate from the remote unit and is configured to be inserted in an ear of a user, and wherein each of the at least one earphone comprises at least one sound reproduction unit;

controlling sound that is reproduced by the respective sound reproduction unit, in response to the at least one ambient sound parameter, the at least one control parameter or the at least one control command received from the remote unit, applying at least one representation of a passive insertion loss (PIL), an active insertion loss (AIL), or a total insertion loss (TIL) of the at least one earphone to a representation of an ambient sound signal captured by the at least one microphone, in order to determine an ambient sound signal representative for ambient sound entering the user's ear, wherein the remote unit;

determining at least one of the at least one sound parameter, the control parameter, the control command at least based on the ambient sound signal representative for ambient sound entering the user's ear, and applying active noise cancellation via the at least one earphone, wherein the active noise cancellation as applied by the at least one earphone contributes to the AIL, and wherein the TIL is at least based on the AIL.

15. An earphone system comprising:

at least one earphone comprising at least one sound reproduction unit; and a remote unit that is separate from each of the at least one earphone, wherein the remote unit comprises at least one microphone configured to capture ambient sound, wherein the remote unit is configured to:

at least one of evaluate, analyze or process the ambient sound captured by the at least one microphone, determine one or more of at least one ambient sound parameter, at least one control parameter, and at least one control command, based on the ambient sound, and transmit at least one of the at least one ambient sound parameter, the at least one control parameter or the at least one control command to the at least one earphone, wherein the at least one earphone is configured to control sound that is reproduced by the respective sound reproduction unit, in response to the at least one ambient sound parameter, the at least one control parameter or the at least one control command received from the remote unit, wherein the remote unit is configured to apply at least one representation of a passive insertion loss (PIL), an active insertion loss (AIL), or a total insertion loss (TIL) of the at least one earphone to a representation of an ambient sound signal captured by the at least one microphone, in order to determine an ambient sound signal representative for ambient sound entering the user's ear, wherein the remote unit determines at least one of the at least one sound parameter, the control parameter, and the control command at least based on the ambient sound signal representative for ambient sound entering the user's ear, wherein the at least one earphone is configured to apply active noise cancellation, wherein the active noise cancellation as applied by the at least one earphone contributes to the AIL, and wherein the TIL is at least based on the AIL.

16. The earphone system of claim 15, wherein the sound controlled by the at least one earphone comprises at least one of a general sound, a masking sound, and a noise reducing sound; and controlling the sound that is reproduced by the at least one sound reproduction unit comprises at least one of controlling an output of the sound or controlling the adaptation of at least one sound parameter of the sound.

17. The earphone system of claim 15, wherein the at least one earphone is configured to adapt at least one sound parameter of the sound that is reproduced by the respective sound reproduction unit depending on at least one corresponding sound parameter of the ambient sound; and the at least one sound parameter represents at least one coefficient of at least one of a spectral shape, a frequency spectrum, a magnitude spectrum, a spectral content, and a loudness measure of at least one frequency range of the respective sound.

18. The earphone system of claim 15, wherein the remote unit is configured to determine the at least one control parameter or the control command at least based on at least one sound parameter of either one of a general sound and a noise masking sound, wherein the at least one sound parameter of the general sound or the noise masking sound is determined from an audio signal that is stored locally in the at least one earphone or that is transmitted wirelessly to the at least one earphone by the remote unit, and the at least one sound parameter of the general sound or of the noise masking sound is determined from the audio signal by applying of at least one transfer function of the at least one sound reproduction unit of the at least one earphone.

* * * * *